(12) United States Patent
Flosbach

(10) Patent No.: US 6,550,313 B1
(45) Date of Patent: Apr. 22, 2003

(54) TEST GAS LEAKAGE DETECTION APPARATUS

(75) Inventor: Rudolf Flosbach, Wipperfurth (DE)

(73) Assignee: Inficon GmbH (DE)

(*) Notice: Subject to any disclaimer, the term of this patent is extended or adjusted under 35 U.S.C. 154(b) by 0 days.

(21) Appl. No.: 09/869,239

(22) PCT Filed: Nov. 18, 1999

(86) PCT No.: PCT/EP99/08858
§ 371 (c)(1),
(2), (4) Date: Jun. 26, 2001

(87) PCT Pub. No.: WO00/45144
PCT Pub. Date: Aug. 3, 2000

(30) Foreign Application Priority Data

Jan. 27, 1999 (DE) .......................... 199 03 097

(51) Int. Cl.⁷ .......................... G01M 3/32; G01M 3/18; G01N 1/24
(52) U.S. Cl. .................. 73/40.7; 73/49.3; 73/864.83
(58) Field of Search ............... 73/40.7, 49.3, 73/426, 864.83

(56) References Cited

U.S. PATENT DOCUMENTS

| | | | | |
|---|---|---|---|---|
| 2,567,215 A | * | 9/1951 | Lacks ........................... 73/40 |
| 4,459,844 A | | 7/1984 | Burkhart ..................... 73/40.7 |
| 4,499,752 A | * | 2/1985 | Fruzzetti et al. ............. 73/40.7 |
| 4,608,866 A | * | 9/1986 | Bergquist ................... 73/40.7 |
| 4,893,499 A | * | 1/1990 | Layton et al. .............. 73/49.3 |
| 5,022,265 A | * | 6/1991 | Voss ............................ 73/40.7 |
| 5,033,287 A | * | 7/1991 | Watanabe et al. ............ 73/52 |
| 5,172,583 A | * | 12/1992 | Tallon ........................ 73/40.7 |
| 5,231,868 A | * | 8/1993 | Dick .......................... 73/49.3 |
| 5,417,105 A | * | 5/1995 | Martinez et al. ............. 73/40.7 |
| 5,565,619 A | * | 10/1996 | Thungstrom et al. ........ 73/40.7 |
| 5,786,529 A | * | 7/1998 | Voss et al. ................... 73/40.7 |
| 6,286,362 B1 | * | 9/2001 | Coffman et al. ............. 73/40.7 |
| 6,314,793 B1 | * | 11/2001 | Webb et al. ................. 73/40.7 |

FOREIGN PATENT DOCUMENTS

| | | |
|---|---|---|
| DE | 41 27 543 | 2/1993 |
| DE | 196 42 099 | 4/1998 |
| EP | 0 444 434 | 2/1991 |
| GB | 1157009 | 7/1969 |
| WO | 98/16809 | 4/1998 |

OTHER PUBLICATIONS

Wilson, A Mobile Multistage 3000–cfm Pumping System, The Journal of Vacuum Science and Technology, vol. 9, No. 1 pp. 60–64.

* cited by examiner

Primary Examiner—Daniel S. Larkin
Assistant Examiner—David J. Wiggins
(74) Attorney, Agent, or Firm—Wall Marjama & Bilinski LLP

(57) ABSTRACT

The invention relates to a test gas leakage detection apparatus (1) comprising a test chamber (2) and supply and measuring devices such as fore-pumps and high-vacuum pumps, test gas detectors, electronic components, etc. In order to construct an apparatus of this type in a manner which is simple and which does not restrict mobility, the invention provides that the test chamber (2) and the supply and measuring devices are combined to form a modular unit, and that the test chamber (2) is supported on a housing (3) in which the supply and measuring devices are accommodated. In addition, air cooling devices are assigned to thermally critical components of the supply and measuring devices.

7 Claims, 2 Drawing Sheets

TEST GAS LEAKAGE DETECTION APPARATUS

BACKGROUND OF THE INVENTION

The present invention relates to a test gas leakage detection apparatus comprising a test chamber and supply and measuring devices such as fore-pumps and high-vacuum pumps, test gas detector and electronic components, etc.

From the international publication WO 98/16 809 a test gas leakage detection apparatus of this kind is known. It serves the purpose of detecting leakages in the packages of packaged items, be they food stuffs, pharmaceuticals, non-reusable items used in the area of medicine etc. Such leakage detection apparatus are being employed on production lines. The packages of the tightly sealed products are sampled at random for leakages.

It has been found to be expedient that a leakage detection apparatus of the kind affected here be mobile, i.e. it must be possible to easily move the entire system (test chamber, supply and measuring devices) to a different location. After a change in the location of the leakage detection apparatus, it shall be possible to start it up without the necessity of having to provide complex connections to external supplying equipment—with the exception of the electrical power supply.

SUMMARY OF THE INVENTION

The present invention is based on the task of creating a leakage detection apparatus of the aforementioned kind, which meets the requirements detailed.

This task is solved by the present invention, by combining the test chamber as well as the supply and measuring devices in a modular unit, where the test chamber is supported on a housing in which all components of the supply and measuring devices are accommodated, and in which thermally critical components of the measuring and supply devices are assigned to air cooling devices.

A test gas leakage detection apparatus having these features may be built to be compact and mobile—on castors, for example—without the risk of thermally critical components attaining unacceptably high temperatures. Owing to the air cooling devices, the test gas leakage detection apparatus according to the present invention is independent of other cooling means.

BRIEF DESCRIPTION OF THE DRAWINGS

Further advantages and details of the present invention shall be explained with reference to the design examples depicted in drawing FIGS. 1 and 2. Depicted in drawing

DETAILED DESCRIPTION OF THE INVENTION

Figure 1:
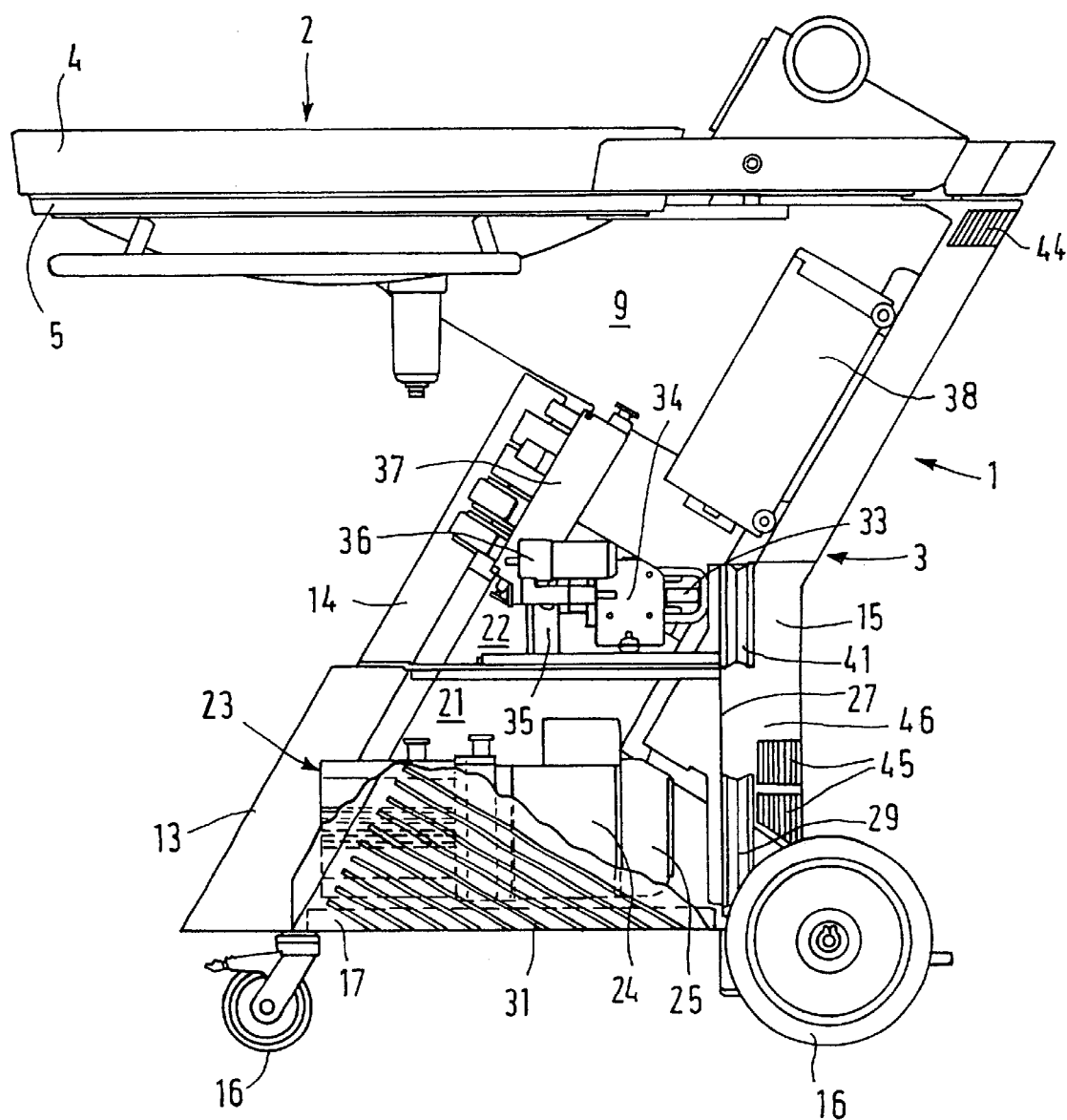
FIG. 1 is a vertical section through the test gas leakage detection apparatus according to the present invention and drawing
Figure 2:
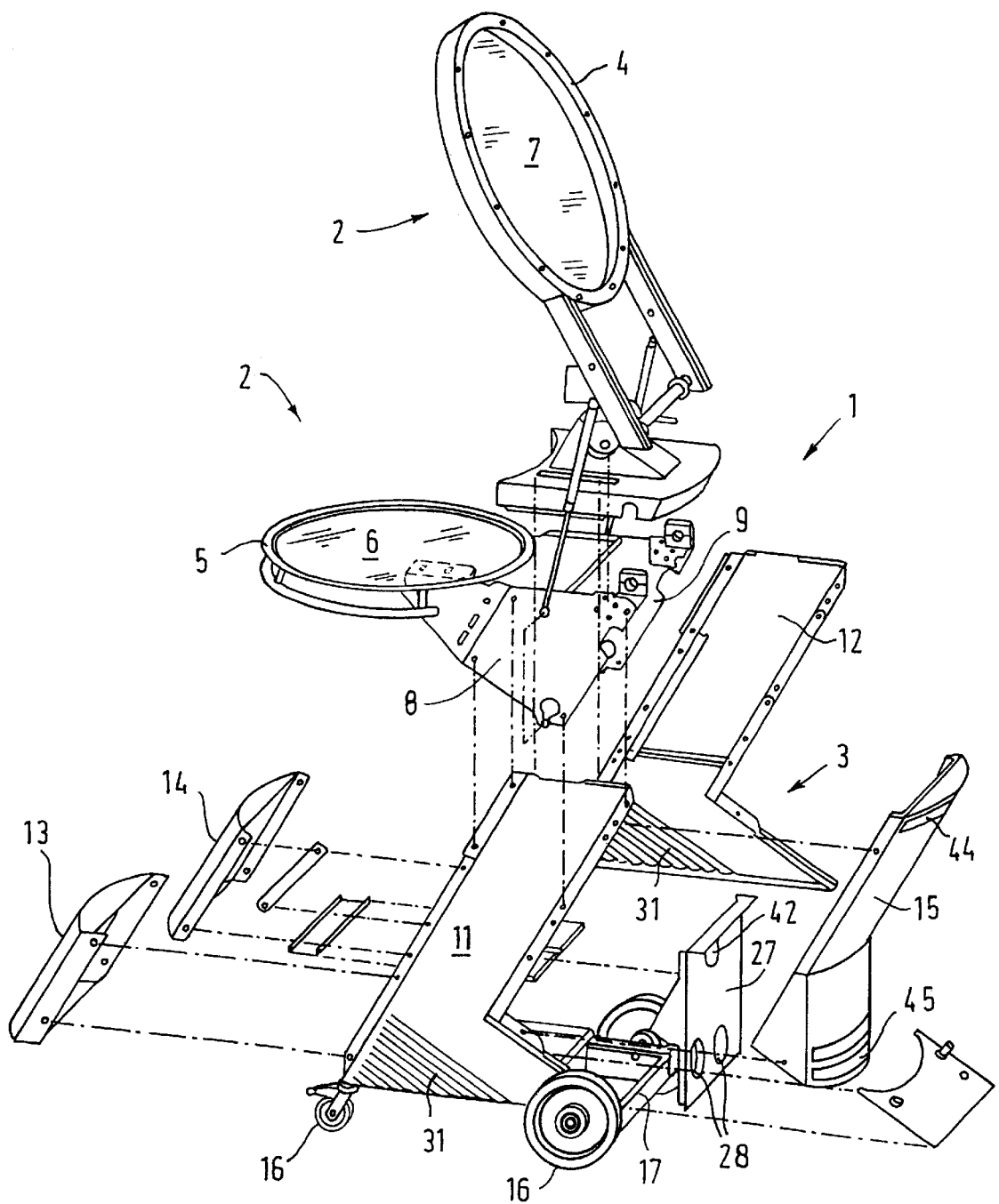
FIG. 2 is an exploded view of test chamber and housing.

The test gas leakage detection apparatus 1 depicted in drawing FIGS. 1 and 2 comprises the test chamber 2 and the housing 3. The test chamber consists of two frames 4 and 5, into which one each foil 6, 7 is clamped (see the aforementioned publication on the state-of-the-art). Test chamber 2 is supported on the housing 3 by wall sections 8, 9.

The housing 3 is equipped with side wall sections 11, 12, front and rear wall sections 13, 14, resp. 15 and a frame 17 movable on castors 16, said frame supporting the housing 3 and—via the housing 3—the test chamber 2.

Depicted in drawing FIG. 1 are a lower (21) and an upper chamber 22 located within housing 3. In the lower chamber two fore-pumps 23 (one is not shown) are arranged, the drive motors 24 of which are equipped in a manner basically known with ventilating blade wheels 25. The arrangement for the pumps 23 in the lower chamber 21 has been so selected that the ventilating blade wheels 25 face an intermediate wall 27, which in the design example is located in front of the rear wall section 15. Provided in the intermediate wall 27 are openings 28 (drawing FIG. 2) and fans 29 (drawing FIG. 1) assigned to each of the fore-pumps 23. Said openings are arranged on a common axis with respect to the ventilation blade wheels 25 of the pumps 23.

The cooling air being drawn in from the outside penetrates fans 29, 25 flows around the drive motors 24 as well as the pump bodies 23 and is discharged from the lower chamber 21 through air discharge slots 31 located in the side walls 11, 12.

By accommodating the fore-pumps 23 in the lower chamber 21 of the housing 3, the centre of gravity of the entire leakage detection apparatus 1 will be relatively low by design. Thus the risk of toppling is much reduced.

Located in the upper chamber are the test gas detector (mass spectrometer) 33, a high-vacuum pump (turbomolecular pump) 34, an amplifier 35, a test leak 36, a valve block 37 and an electronics insert 38. Valve block 37 and insert 38 are arranged above the other components 33 to 36 supported by the floor of chamber 22.

Cooling of the, in part, thermally most critical components 33 to 38 is effected by means of a fan 41, which initially generates a horizontal air flow for cooling the components 33 to 36 located in the lower area of chamber 22. Fan 41 is accommodated in an opening 42 which is also arranged in the intermediate wall 27. The air flow, which after having passed over components 33 to 36 is deflected to the top, cools on its way the components 37 and 38 and is discharged from the upper chamber 22 through the air discharge slots 44 which are located in the upper part of the rear wall 15.

The rear wall 15 with a curvature towards the outside is equipped in the lower section with air supply slots 45 and forms together with the intermediate wall 27 a complete air supply chamber 46, through which all fans 29 and 41 are supplied with cooling air. This arrangement offers the advantage that only one air supply opening is present (air slots 45) so that filtering devices for the entering air need to be present only once.

What is claimed is:

1. Apparatus for testing sealed packages containing a test gas for leaks that includes:

a mobile housing that is fully contained and capable of testing said sealed packages at various locations thru a manufacturing or distribution facility;

a test chamber for enclosing a package containing a test gas supported upon said housing, vacuum means for evacuating the test chamber, where said vacuum means is also mounted within said housing, gas detecting means mounted within housing for analyzing the gas within the evacuated test chamber to determine the presence of a test gas; and air cooling means mounted within said housing for passing cooling air over thermally critical components associated with said vacuum means and said gas detecting means.

2. The apparatus of claim 1 wherein said housing includes an upper compartment and a lower compartment, and said cooling means further includes a first cooling fan mounted in said upper compartment and a second cooling fan mounted in the lower compartment.

3. The apparatus of claim 2 that includes at least one fore-pump that is located in the lower compartment and said second cooling fan is arranged to direct cooling air over said fore-pump.

4. The apparatus of claim 3 wherein said gas detector means and a high vacuum pump are located in the upper compartment of the housing and said first cooling fan is arranged to pass cooling air over the gas detector means and the high vacuum pump.

5. The apparatus of claim 4 that further includes air handling means for redirecting the horizontal cooling air flow in the upper compartment upwardly over an electronic package located in the upper compartment.

6. The apparatus of claim 2 wherein the housing includes side walls containing air inlet openings and air discharge openings to allow cooling air to pass through said compartments.

7. The apparatus of claim 6 wherein the first and second cooling fans are connected by a common supply duct located adjacent to a rear wall of the housing and wherein an air inlet opening is mounted in the rear wall of the housing through which supply air is drawn into the supply duct.

* * * * *